US006115588A

United States Patent [19]

Nasuda

[11] Patent Number: 6,115,588

[45] Date of Patent: Sep. 5, 2000

[54] RADIO SELECTIVE CALLING RECEIVER HAVING INFRARED DATA TRANSMISSION

[75] Inventor: Takaaki Nasuda, Shizuoka, Japan

[73] Assignee: NEC Corporation, Tokyo, Japan

[21] Appl. No.: 08/910,422

[22] Filed: Aug. 13, 1997

[30] Foreign Application Priority Data

Aug. 15, 1996 [JP] Japan .................................. 8-215695

[51] Int. Cl.[7] ........................................ H04Q 7/14

[52] U.S. Cl. .................... 455/228; 340/825.44; 359/152; 359/154

[58] Field of Search .................................. 455/31.1, 31.2, 455/68, 70, 73, 130, 133, 150, 228; 359/152, 153, 180, 189, 154; 340/825.44

[56] References Cited

U.S. PATENT DOCUMENTS

| | | | |
|---|---|---|---|
| 4,804,955 | 2/1989 | Yoshizawa | 340/825.44 |
| 5,727,049 | 3/1998 | Sato | 379/96 |
| 5,757,277 | 5/1998 | Kobayashi | 340/825.22 |
| 5,764,393 | 6/1998 | Okamura et al. | 359/145 |
| 5,847,981 | 12/1998 | Kelly et al. | 364/750.5 |

FOREIGN PATENT DOCUMENTS

| | | | |
|---|---|---|---|
| 10720398 | 7/1996 | European Pat. Off. . | |
| 22285328 | 7/1995 | United Kingdom . | |
| 32298506 | 9/1996 | United Kingdom . | |

*Primary Examiner*—Edward F. Urban
*Assistant Examiner*—Congvan Tran
*Attorney, Agent, or Firm*—Sughrue, Mion, Zinn, Macpeak & Seas, PLLC

[57] ABSTRACT

A radio selective calling receiver which can prevent reliably a radio section from being affected by a noise generated in a boosting circuit during an infrared-ray communication, whereby a reception sensitivity in the radio section can be prevented from being degraded. The radio selective calling receiver has a memory 14 for storing reception information received by the radio section 2 and an infrared-ray data communication section 24 for outputting the reception information stored in the memory 14 to an external terminal by means of an infrared ray and for receiving infrared-ray data from the external data terminal so as to cause a first control means 4 to control the infrared-ray data communication of the infrared-ray data communication section 24 if telecommunication dispatching is inputted and to cause a second control means 10 to inhibit the infrared-ray data communication during an operation of the radio section 2 even if the telecommunication dispatching is inputted.

7 Claims, 3 Drawing Sheets

RADIO SELECTIVE CALLING RECEIVER HAVING INFRARED DATA TRANSMISSION

BACKGROUND OF THE INVENTION

1. Field of the Invention

The present invention relates to a radio selective calling receiver and more particularly to a radio selective calling receiver having an infrared-ray communication function in use for communication with an external information terminal with an infrared-ray in addition to receiving radio selective call signals.

2. Description of the Related Art

Some conventional radio selective calling receivers have functions to output reception information or a fixed-type message which has been registered to an external data terminal by means of an infrared ray and to input information from the external data terminal in addition to an original radio selective calling receiving function. In such a conventional radio selective calling receiver having the infrared-ray communication function, a message or the like is transferred for a communication with an external data terminal independently of an operation of a radio section.

In addition, in the conventional radio selective calling receiver, a boosting circuit for boosting a primary supply voltage such as a dry cell is used to drive an infrared-ray emitting element; consumed current of an infrared-ray interface section comprising the infrared-ray emitting element and the driving circuit is extremely greater than consumed current of other circuits. A communication with the external data terminal is independent of a receiving operation of the radio section as described above, so that independent communication processing is performed based on telecommunication dispatching of an infrared-ray data communication.

In this conventional radio selective calling receiver, however, there is a problem that, if an infrared-ray data communication is performed during a receiving operation of the radio section, or if the receiving operation of the radio section is started during an infrared-ray data communication, an operation of the infrared-ray interface section causes a great fluctuation of the consumed current of the primary power supply, whereby a noise is generated by the boosting circuit and as a result a reception sensitivity of the radio section is significantly degraded due to the noise. Accordingly, in Japanese Patent Application No. 64964/95, to solve the above problem, there is disclosed a radio selective calling receiver having an infrared-ray data transmission function, comprising a memory for storing reception information received by a radio section, an infrared-ray data transmitting section for outputting input data to an external terminal by means of an infrared ray, an infrared-ray data transmission control section for controlling data transmission so that the reception information can be transmitted from the infrared-ray data transmitting section while also transmitting the reception information stored in the memory to the infrared-ray data transmitting section at an occurrence of a transmission dispatching operation from the external terminal, and a control means for controlling the transmitting operation in the infrared-ray data transmitting section so as to be stopped during an operation of the radio section.

According to the above-described prior application, it is possible to prevent a reception sensitivity in the radio section from being degraded by stopping the transmitting operation in the infrared-ray data transmitting section during an operation of the radio section since it prevents the operation of the radio section and the infrared-ray data transmitting operation from overlapping each other, which removes an effect of the noise given to the radio section by the boosting circuit during the infrared-ray transmitting operation.

The problem, however, occurs such as a degraded reception sensitivity of the radio section which occurs during the infrared-ray data transmission as described above also when infrared-ray data is received from the external data terminal during a receiving operation of the radio section.

SUMMARY OF THE INVENTION

The present invention is provided to solve the above problem. It is therefore an object of the present invention to provide a radio selective calling receiver which can easily and reliably prevent a reception sensitivity of a radio section from being degraded by an effect of a noise generated in an infrared-ray data communication.

According to one aspect of the present invention, there are provided a memory for storing reception information received by a radio section and an infrared-ray data communication section for outputting the reception information stored in the memory to an external terminal by means of an infrared ray and for receiving infrared-ray data from the external data terminal, so as to cause a first control means to control the infrared-ray data communication of the infrared-ray data communication section if telecommunication dispatching is inputted and to cause a second control means to inhibit the infrared-ray data communication during an operation of the radio section even if the telecommunication dispatching is inputted.

According to another aspect of the present invention, the second control means is connected to a display section for displaying an inhibition of the infrared-ray data communication.

According to still another aspect of the present invention, the second control means has a function to stop a communicating operation of the infrared-ray data communication section and the infrared-ray data transmission from the external data terminal a fixed time previous to a start of an operation of the radio section.

According to further still another aspect of the present invention, the second control means has a function to transmit a stop signal for stopping temporarily the infrared-ray data transmission of the external data terminal a fixed time previous to a start of the operation of the radio section and a restart signal for restarting the infrared-ray data transmission of the external data terminal simultaneously with a stop of the operation of the radio section to the external data terminal through the infrared-ray data communication section.

DETAILED DESCRIPTION OF THE PREFERRED EMBODIMENTS

Figure 1:
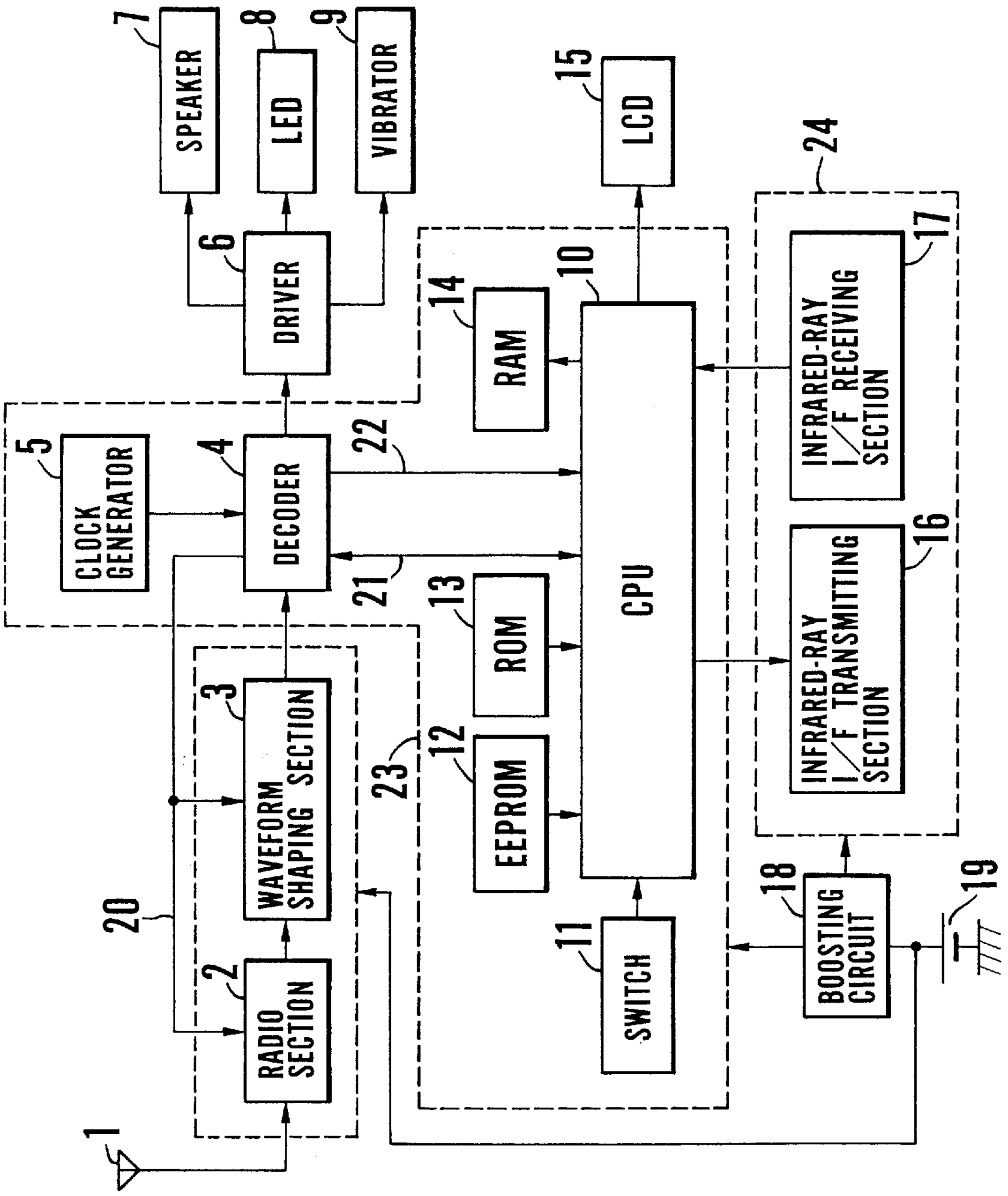
FIG. 1 is a block diagram illustrating a radio selective calling receiver according to an embodiment of the present invention.

An embodiment of the present invention will now be described by reference to accompanying drawings. Referring to FIG. 1, a block diagram shows a radio selective calling receiver of the present invention. In this drawing, an antenna 1 is connected to a radio section 2 and the radio section 2 is connected to a decoder 4 via a waveform shaping section 3. The decoder 4 is connected to a clock generator 5 in which a clock signal is inputted for generating various timing signals. Further, the decoder 4 is connected to a speaker 7, a light emitting diode (hereinafter, LED) 8, and a driver 6 for driving a vibrator 9. The decoder 4 controls an active or inactive operation of the radio section 2 and the waveform shaping section 3 by means of a high (H) or low (L) radio section operation control signal 20. Between the decoder 4 and a microprocessor (hereinafter, CPU) 10 as a control means, a system bus 21 is connected in addition to a control line 22 for transmitting an infrared-ray data communication control signal to the CPU 10.

In addition, the CPU 10 is connected to an electrically erasable and programmable read only memory (hereinafter, EEPROM) 12 in which a call number of the receiver is stored, a read only memory (hereinafter, ROM) 13 as a memory for storing a program to be a procedure of the CPU 10, and a random access memory (hereinafter, RAM) 14 as a memory for temporarily storing data or the like generated during processing of the CPU 10. Furthermore, the CPU 10 is connected to a switch 11 for inputting telecommunication dispatching from an external terminal, a liquid crystal display (hereinafter, LCD) 15 as a display section for displaying a message or the like received by the radio section 2, an infrared-ray interface (hereinafter, interface-ray I/F) transmitting section 16 for an infrared-ray data communication, and an infrared-ray I/F receiving section 17. The infrared-ray I/F transmitting section 16 has an infrared-ray emitting element and the infrared-ray I/F receiving section 17 has a photoreceiving element. A boosting circuit 18, which is used for boosting a voltage of a primary power supply 19 such as a dry cell, supplies power from a boosted DC power supply to a control section 23 including the decoder 4 and the CPU 10 and to an infrared-ray data communication section 24 comprising an infrared-ray I/F transmitting section 16 and an infrared-ray I/F receiving section 17.

Next, an operation will be described below. First, a selective call signal received by the antenna 1 is amplified and demodulated in the radio section 2, waveform-shaped in the waveform shaping section 3, and inputted into the decoder 4. The decoder 4 compares a call number in a signal transmitted from the waveform shaping section 3 with a call number of the receiver which has been previously written into the EEPROM 12, and then if they match, it outputs a message signal and data following the call number to the CPU 10. Therefore, the CPU 10 outputs an informational signal for giving an information that a call has been made to the decoder 4, and the decoder 4 outputs the informational signal which has been received from the CPU 10 to the driver 6 and further gives an information that the call has been made by driving the speaker 7, the LED 8, and the vibrator 9.

The CPU 10 receives the data of the call number of the receiver and the message signal from the decoder 4 and then stores them in the RAM 14. If telecommunication dispatching for starting an infrared-ray data transmission is inputted by an external operation of the switch 11 at this point, it means that the CPU 10 has received an infrared-ray data transmission request and therefore it transmits the data and the message information stored in the RAM 14 to the infrared-ray I/F transmitting section 16. It causes the infrared-ray I/F transmitting section 16 to output data to an external data terminal or the like by means of an infrared ray. If telecommunication dispatching for starting an infrared-ray data reception is received with an operation of the switch 11, infrared-ray data from the external data terminal is received by the infrared-ray I/F receiving section 17 and then it is processed by the CPU 10. The normal operation is as described above.

Figure 2:
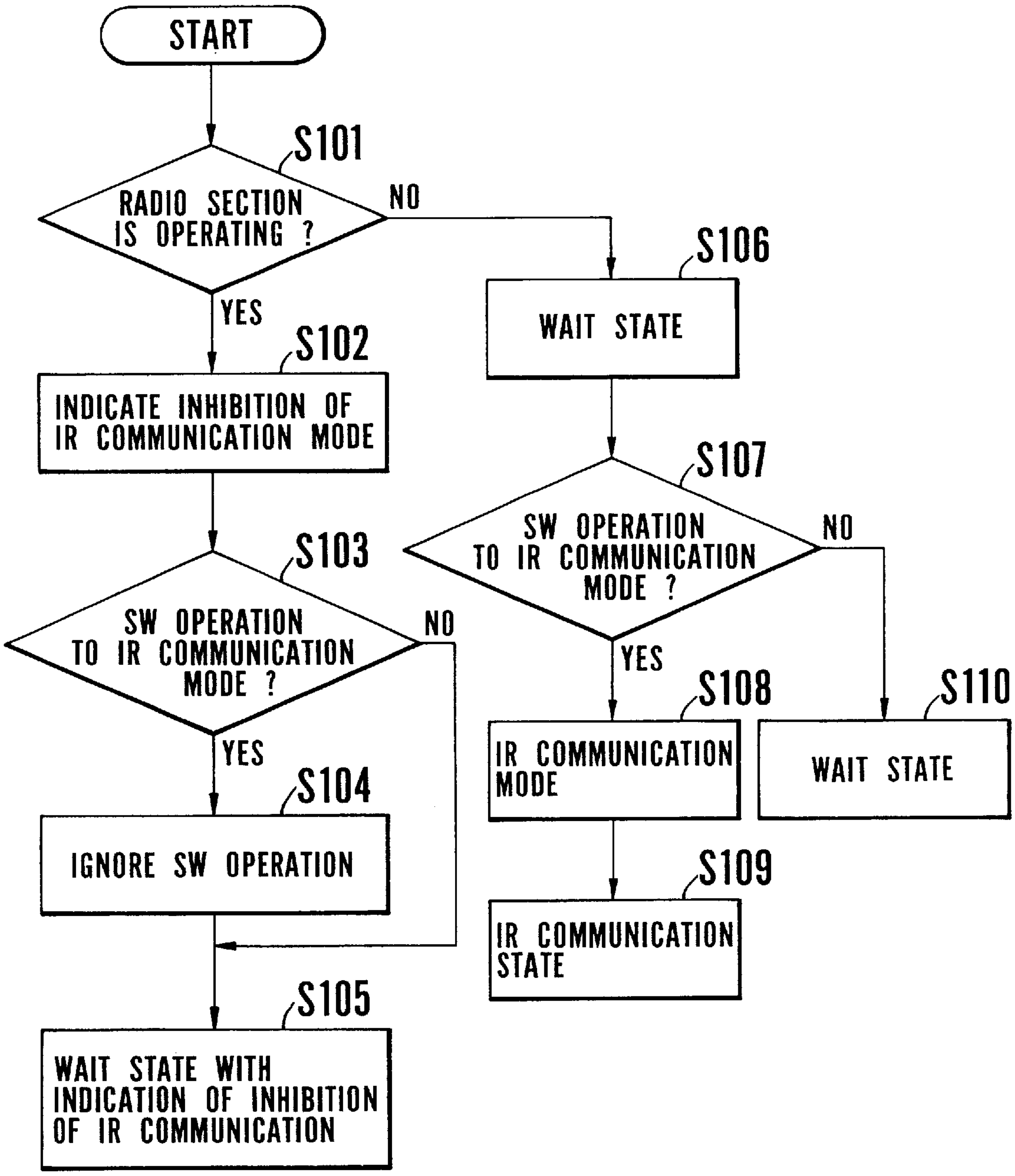
FIG. 2 is a flowchart illustrating a flow of an operation of the radio selective calling receiver shown in FIG. 1.

The following describes a procedure of inhibiting dispatching for starting an infrared-ray data communication through the CPU 10 if the switch 11 is operated during a receiving operation of the radio section 2, based on a flowchart shown in FIG. 2. First, it is checked that the radio section 2 is operating (Step S101). If it is confirmed to be operating, an indication is made on the LCD 15 that an infrared-ray data communication should be inhibited (Step S102). Subsequently, it is checked that the switch 11 has been operated to enter an infrared-ray data communication mode in this state (Step S103). If it has been operated, an interrupt caused by the switch operation is ignored (Step S104) and then the control returns to a wait state for a selective call signal with an indication of inhibiting an infrared-ray data communication (Step S105). Unless the switch has been operated, the wait state is continuously kept for the selective call signal with the indication of inhibiting the infrared-ray data communication (Step S105).

Additionally, if the radio section 2 is not operating in Step S101, the wait state for the selective call signal is kept (Step S106) and it is checked that the switch 11 has been operated to enter the infrared-ray data communication mode at this point (Step S107). Unless it has been operated, the control enters a normal wait state for a selective call signal (Step S110). Conversely, if the switch has been operated, the control enters the infrared-ray data communication mode (Step S108) to perform the infrared-ray data communication (Step S109).

Figures 3A, 3B, 3C, 3D, 3E:
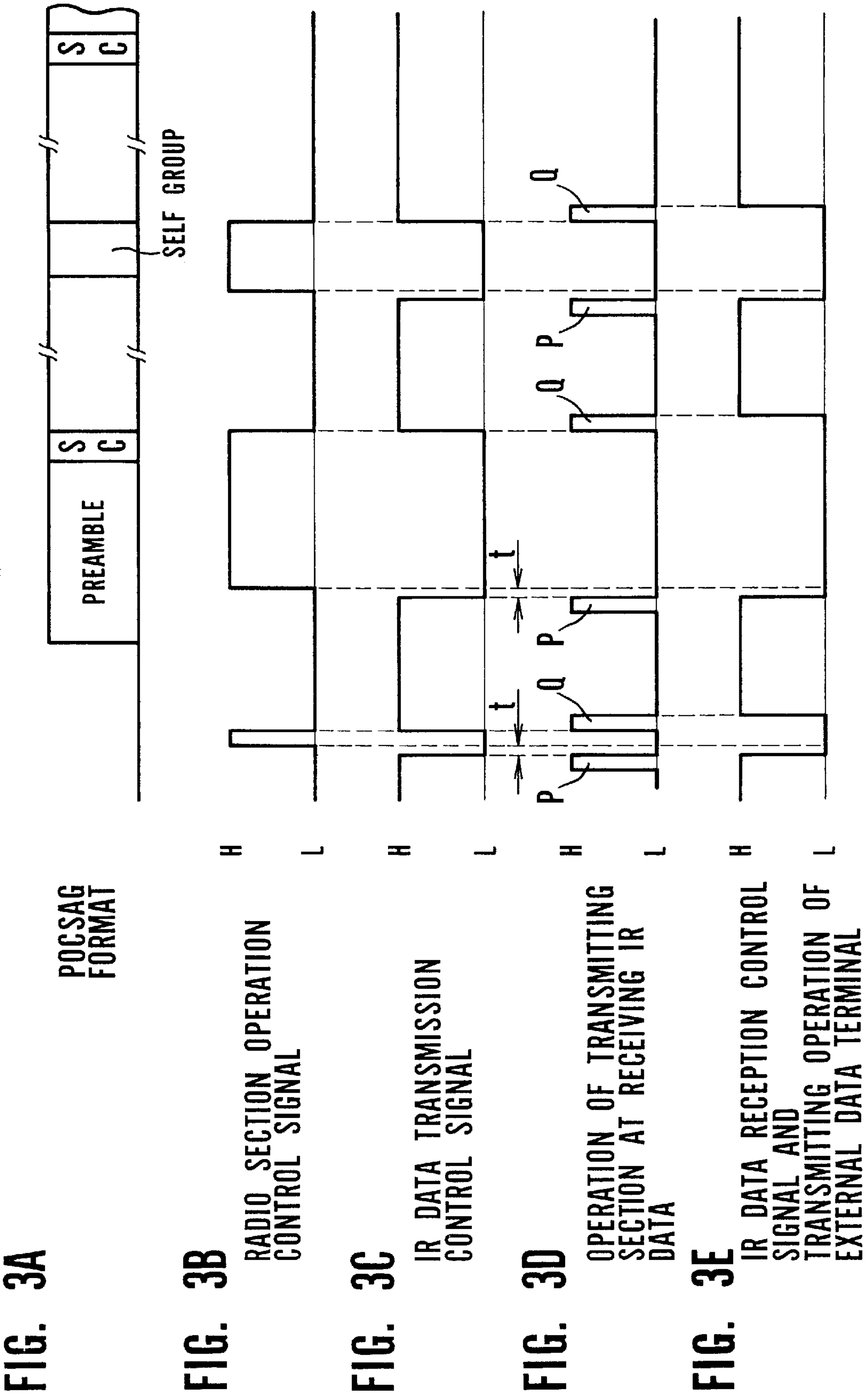
FIG. 3 is a timing chart illustrating signals of respective portions in a circuit of the radio selective calling receiver shown in FIG. 1.

Next, an explanation will be made for a case that the radio section operates during infrared-ray data communication of the infrared-ray data communication section 24. Referring to FIG. 3A, there is shown a signal format in a (POCSAG) method in which a space is made by approx. 6 characters. Referring to FIG. 3B, there is shown a waveform of a radio section operation control signal 20 which is transmitted from the decoder 4 to the radio section 2 and the waveform shaping section 3. The radio section 2 and the waveform shaping section 3 operate at High (H) of the radio section operation control signal 20 and stop their operation at Low (L) thereof. With the intermittent operation of the radio section 2 and the waveform shaping section 3, the decoder 4 retrieves signals in the POCSAG method. If the decoder 4 detects a preamble in a signal in the POCSAG method sent from the radio section 2 via the waveform shaping section 3, the radio section 2 and the waveform shaping section 3 are intermittently turned on and a synchronizing signal SC is retrieved. After the synchronizing signal SC is detected, the intermittent operation of the radio section 2 and the waveform shaping section 3 is performed again and the radio section 2 and the waveform shaping section 3 are controlled to be turned on again at a transmission timing for a signal to the receiver so as to receive a signal of the self group subsequently.

First, an explanation will be made for a case that infrared-ray data is transmitted to an external data terminal. In a period during which the radio section 2 and the waveform shaping section 3 are turned off by the decoder 4, infrared-ray data can be transmitted to the external terminal. Referring to FIG. 3C, there is shown an infrared-ray data transmission control signal sent from the decoder 4 to the CPU 10, in which an infrared-ray transmitting operation is permitted at H and stopped at L. In other words, the radio section operation control signal 20 and the infrared-ray data transmission control signal are inverted each other except a part of them. Subsequently, is described the infrared-ray data transmitting operation and the operation switching timing of the radio section 2 and the waveform shaping section 3. During a fixed time t after the infrared-ray data transmitting operation is switched from the transmission state to the stopped transmission state, there is noise radiation from the boosting circuit 18. Therefore, this receiver has a configuration in which an infrared-ray data transmission control signal is sent from the decoder 4 to the CPU 10 so that the infrared-ray data transmission stop operation is completed a fixed time previous to starting the operation of the radio section 2 and the waveform shaping section 3. The CPU 10 which has received an infrared-ray data transmission control signal as shown in FIG. 3C controls data transmission to the infrared-ray I/F transmission section 16 and its stop operation.

Next, an explanation will be made for a case that infrared-ray data is received from the external data terminal. In the same manner as for the transmission, in a period during which the radio section 2 and the waveform shaping section 3 are turned off, infrared-ray data can be received from the external data terminal. Referring to FIG. 3D, there is shown an operation of the infrared-ray data communication section 24 to control a transmitting operation of the external data terminal. Referring to FIG. 3E, there is shown an infrared-ray data reception control signal and a timing of the transmitting operation of the external data terminal. The decoder 4 transmits to the external data terminal a stop signal P for stopping temporarily a transmission from the external data terminal a fixed time previous to a start of the operation of the radio section 2 and the waveform shaping section 3. Simultaneously with the transmission, the operation of the infrared-ray data reception section is stopped. Therefore, the data terminal which has received the stop signal P stops the transmission of the infrared-ray data temporarily. Then, the infrared-ray data communication section 24 transmits a restart signal Q for restarting the transmitting operation of the external data terminal simultaneously with the stop of the operation of the radio section 2 and the waveform shaping section 3. Simultaneously with the transmission of the restart signal Q, the operation of the infrared-ray data reception section is restarted. The external data terminal which has received the stop signal until then restarts the transmission of the infrared-ray data.

As set forth hereinabove, according to the present invention, there are provided a memory for storing reception information received by a radio section and an infrared-ray data communication section for outputting the reception information stored in the memory to an external terminal by means of an infrared ray and for receiving infrared-ray data from the external data terminal, so as to cause a first control means to control the infrared-ray data communication of the infrared-ray data communication section if telecommunication dispatching is inputted and to cause a second control means to inhibit the infrared-ray data communication during an operation of the radio section even if the telecommunication dispatching is inputted, and therefore it is possible to inhibit the infrared-ray data communication during the operation of the radio section even if the telecommunication dispatching is inputted, whereby it is possible to prevent the operation of the radio section and the infrared-ray data communication from overlapping each other, and as a result, advantageously the radio section can avoid reliably being affected by a noise generated in the boosting circuit during the infrared-ray communication so as to prevent the reception sensitivity from being degraded by the radio section.

Further, according to the present invention, the radio selective calling receiver has a configuration in which the second control means is connected to a display section for displaying an inhibition of the infrared-ray data communication, and therefore advantageously it is possible to make a user recognize reliably that the infrared-ray data communication is currently inhibited, so that the radio section can continue to receive data.

Still further, according to the present invention, the radio selective calling receiver has a configuration in which the second control means has a function to stop a communicating operation of the infrared-ray data communication section and the infrared-ray data transmission from the external data terminal a fixed time previous to a start of the operation of the radio section, and therefore advantageously it is possible to prevent effectively noise radiation from the boosting circuit from adversely affecting the reception sensitivity of the radio section at a switching timing from the infrared-ray data transmitting operation to the operation of the radio section and the waveform shaping section.

Furthermore, according to the present invention, the radio selective calling receiver has a configuration in which the second control means has a function to transmit a stop signal for stopping temporarily the infrared-ray data transmission of the external data terminal a fixed time previous to a start of the operation of the radio section and a restart signal for restarting the infrared-ray data transmission of the external data terminal simultaneously with a stop of the operation of the radio section to the external data terminal through the infrared-ray data communication section, whereby it is possible to stop temporarily the infrared-ray data transmission of the external data terminal before starting the operation of the radio section and to restart the infrared-ray data transmission of the external data terminal simultaneously with the stop of the radio section, and therefore advantageously the radio section can avoid being affected by a noise generated during the infrared-ray communication and a reception of the infrared-ray data from the external data terminal can be reliably restarted.

What is claimed is:

1. A radio selective calling receiver comprising:

a memory for storing reception information received by a radio section;

an infrared-ray data communication section for outputting said reception information stored in said memory to an external terminal by means of an infrared ray and for receiving infrared-ray data from the external data terminal;

a first control means to control the infrared-ray data communication of said infrared-ray data communication section if telecommunication dispatching is inputted; and a second control means to inhibit said infrared-ray data communication during an operation of said radio section even if said telecommunication dispatching is inputted, wherein said second control means has a function to transmit a stop signal for stopping temporarily the infrared-ray data transmission of said external data terminal a fixed time previous to a start of the operation of said radio section and a restart signal for restarting the infrared-ray data transmission of the external data terminal simultaneously with a stop of the operation of said radio section to said external data terminal through said infrared-ray data communication section.

2. A radio selective calling receiver according to claim 1, in which said second control means is connected to a display section for displaying an inhibition of said infrared-ray data communication.

3. A radio selective calling receiver comprising:

a memory for storing reception information received by a radio section;

an infrared-ray data communication section for outputting said reception information stored in said memory to an external terminal by means of an infrared ray and for receiving infrared-ray data from the external data terminal;

a first control section which performs selective control of the infrared-ray data communication of said infrared-ray data communication section; and a second control section which inhibits said infrared-ray data communication in response to an operation of said radio section even in the presence of infrared-ray data from said external terminal, wherein said second control section has a function to transmit a stop signal for stopping temporarily the infrared-ray data transmission of said external data terminal a fixed time previous to a start of the operation of said radio section and a restart signal for restarting the infrared-ray data transmission of the external data terminal simultaneously with a stop of the operation of said radio section to said external data terminal through said infrared-ray data communication section.

4. A radio selective calling receiver according to claim 3, in which said second control section is connected to a display section for displaying an inhibition of said infrared-ray data communication.

5. A radio selective calling receiver according to claim 3, in which said selective control is performed according to the inputting of a telecommunication dispatching signal.

6. A radio selective calling receiver according to claim 5, in which said second control section prevents said telecommunication dispatching signal from effecting selective control during an operation of said radio section.

7. A radio selective calling receiver according to claim 6, in which said telecommunication dispatching signal is inputted via a switch.

* * * * *

UNITED STATES PATENT AND TRADEMARK OFFICE

CERTIFICATE OF CORRECTION

PATENT NO.: 6,115,588
DATED: September 5, 2000
INVENTOR(S): Takaaki NASUDA

It is certified that error appears in the above-identified patent and that said Letters Patent is hereby corrected as shown below:

Column 1, line 26, delete ";" insert --, because--.
line 29, delete "extremely" insert --much--.

Column 2, line 60, delete "FIG. 3 is a timing chart" insert --FIGS. 3A-3E are timing charts--.

Signed and Sealed this

Twenty-ninth Day of May, 2001

Attest:

NICHOLAS P. GODICI

*Attesting Officer*

*Acting Director of the United States Patent and Trademark Office*